G. KHUMBER & A. A. WILLIAMS.
STEAM PACKING VALVE.
APPLICATION FILED OCT. 26, 1914.
1,218,187.
Patented Mar. 6, 1917.
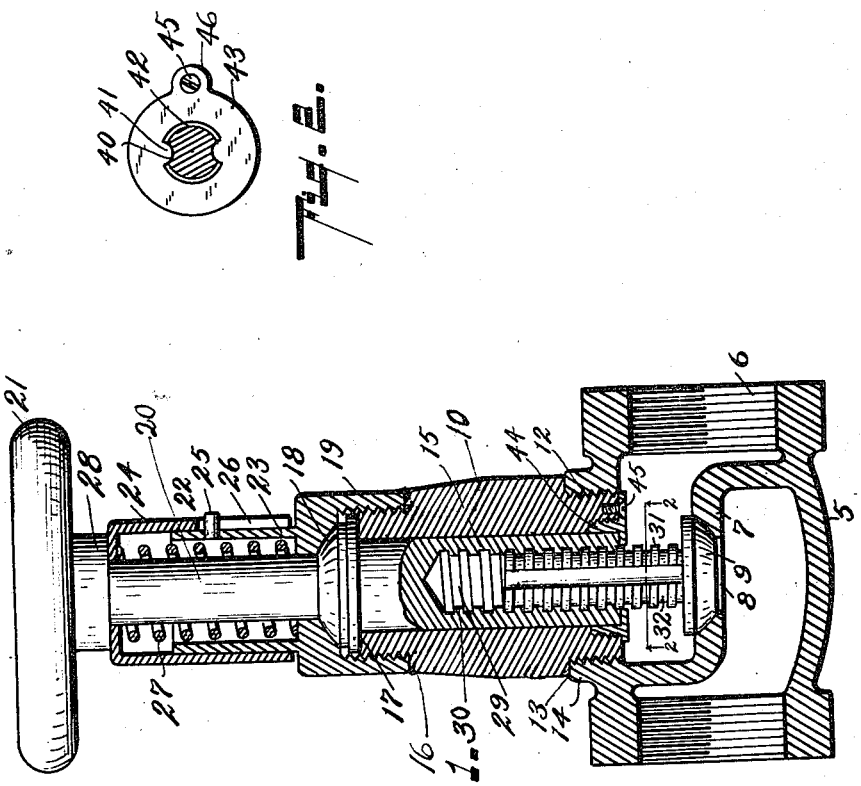
WITNESSES:
Chester E. Warner.
D. Drury
INVENTORS:
ALBERT A. WILLIAMS
GUSTAVE KHUMBER
BY
Jno. G. Powell
ATTORNEY.

UNITED STATES PATENT OFFICE.

GUSTAVE KHUMBER AND ALBERT A. WILLIAMS, OF DENVER, COLORADO.

STEAM-PACKING VALVE.

1,218,187.

Specification of Letters Patent.

Patented Mar. 6, 1917.

Application filed October 26, 1914. Serial No. 868,760.

*To all whom it may concern:*

Be it known that we, GUSTAVE KHUMBER and ALBERT A. WILLIAMS, citizens of the United States, and residents of the city and county of Denver, State of Colorado, have invented certain new and useful Improvements in Steam-Packing Valves; and we do declare the following to be a full, clear, and exact description of our invention, such as will enable others skilled in the art to which it appertains to make and use the same, reference being had to the accompanying drawing, and to the figures of reference marked thereon, which form a part of this specification.

Our invention relates to improvements in steam packing valves, more especially for use and application to boilers, and similar steam containers, and the invention has for its object the provision of a construction and combination of elements whereby the ordinary leather gaskets and packing of other fibrous nature is obviated, and such packing accomplished by the steam expansion.

In the following detail description of our invention, with reference to the accompanying drawing, many other objects of our invention will become apparent.

In the accompanying drawing, Figure 1 is a view of the valve in partial longitudinal section; and Fig. 2 is a view illustrating a part applied to the valve for preventing the valve piece from revolving.

Corresponding and like parts are referred to in the following description and indicated in all the views of the accompanying drawing by the same reference characters.

Let the numeral 5 designate a joint of the passage for the steam, the said joint having threads 6 in its opposite extremities adapted to engage with threads of the pipes forming the passage. A partition 7 is formed in this joint 5, and is provided with an opening 8 therethrough, adapted to be closed by a valve piece 9, which seats against the partition 7, the partition 7 having a machined recess adjacent the opening 8 in which the valve piece 9 is received. The valve piece 9 is also machined to closely fit in the said recess, whereby the valve, when closed, thoroughly seals the opening 9 against the passage of fluid therethrough.

A sleeve 10 is threaded in the joint or union 5, as shown at 12, a shoulder 13 being formed on the said sleeve 10, which engages with a shoulder 14 formed on the union 5, making a fluid proof seal at the point where the said sleeve 10 is connected with the union 5. A valve operating member 15 is revolubly mounted in this sleeve 10, the said operating member being provided with an annular flange 17 which overlaps the extremity of the sleeve 10. The outer surface of this annular flange 17 is of convex contour and machined to closely engage in a concave machined recess 18 of a coupling collar 19, which coupling collar is threaded upon the outer extremity of the sleeve 10, and tightly engages with the outer extremity of the shoulder 16 of the said sleeve 10, forming a tight joint between the coupling collar 19 and the sleeve 10. This shoulder 16 also prevents the coupling collar 19 from being engaged too tightly with the flange 17. An operating wheel 21 is connected with a stem 20, the latter being an extension of the operating member 15 and reduced in diameter and extending through a housing 22. This housing 22 comprises telescoping parts 23 and 24, the part 23 being integrally formed with the collar 19, while the part 24 is received over the part 23. A dowel pin 25 is mounted upon the part 23, and is received in a longitudinal slot 26 of the part 24, thus making the housing 24 extensible in a longitudinal direction, and at the same time preventing the part 24 from revolving with the turning of the stem 20. A spiral spring 27 surrounds the stem 20, on the interior of the housing 24, the said spring being interposed between the coupling collar 19 and the part 24 of the housing 22, the part 24 of the housing 22 being engaged with a shoulder 28 of the operating wheel 21. The tension of this spring 27 constantly holds the machined flange 17 in close engagement in the recess 18 of the collar 19, thereby preventing leakage of the fluid into the housing 22.

The operating member 15 shown in Fig. 1 is provided with a longitudinal hollow 29, in which is arranged threads 30, coöperating with threads 31 formed upon a valve stem 32, which valve stem 32 is received in the hollow 29. This valve stem 32 is provided with longitudinal recesses 40 on opposite sides thereof, which receive projections 41 extending into the opening 42 of a plug, or cap 43. This plug, or cap 43 is provided with a part 44 which is threaded into the inner extremity of the sleeve 10, the said cap, or plug being prevented from being unthreaded from said sleeve by means of a screw 45, passed through an ear 46 of said plug or cap and entering the sleeve 10. It will be understood that the projections 41, received in the recesses 40 of the valve stem 32, prevent the said valve stem from revolving, whereby the said valve stem will be caused to move in a longitudinal direction when the operating member 15 is revolved, causing the valve piece 9 to seat and unseat itself to open or close the opening 8, as the case may be.

While we have described and illustrated herein a specific form of our invention, it is understood that we are not limited thereto, and that the invention may be modified and varied without departing from the spirit of our invention or the scope of the appended claim.

Having thus described our invention, what we claim and desire to secure by Letters Patent is:

A steam packing valve, comprising a union, a valve seat in said union, a sleeve threaded on said union, a collar threaded on the outer extremity of said sleeve, an annular shell member extending from said collar, a second annular shell member telescoping with said first named annular shell member, said annular shell members forming a housing, a valve piece operating member revoluble in said sleeve, said valve piece operating member having a threaded recess therein, a valve piece adapted to be engaged with said valve seat, a threaded valve stem carrying said valve piece, said threaded valve stem being received in said recess of said valve piece operating member, said valve stem having a longitudinal groove therein, a member secured to the inner extremity of said sleeve and having a projection received in said groove of said valve stem whereby said valve piece is prevented from revolving, said valve piece operating member having a reduced part extending through said housing, a handle member connected with said reduced part on the exterior of said housing, an annular flange formed on said valve piece operating member at the inner limit of said reduced part, the said annular flange being engaged by said collar, and a spring surrounding said reduced parts of said valve piece operating member within said housing and acting to hold said annular flange in engagement with said collar.

In testimony whereof we affix our signatures in the presence of two witnesses.

GUSTAVE KHUMBER.
ALBERT A. WILLIAMS.

Witnesses:
CHESTER P. DENNHARDT,
JNO. G. POWELL.